United States Patent [19]

Harrison et al.

[11] Patent Number: 5,565,528
[45] Date of Patent: Oct. 15, 1996

[54] POLYMERIC DISPERSANTS HAVING POLYALKYLENE AND SUCCINIC GROUPS

[75] Inventors: James J. Harrison, Novato; William R. Ruhe, Jr., Benicia, both of Calif.

[73] Assignee: Chevron Chemical Company, San Ramon, Calif.

[21] Appl. No.: 465,507

[22] Filed: Jun. 5, 1995

Related U.S. Application Data

[62] Division of Ser. No. 165,871, Dec. 13, 1993, abandoned.

[51] Int. Cl.$^6$ .................................................. C08F 8/32
[52] U.S. Cl. .......................................................... 525/327.6
[58] Field of Search ............................................. 525/327.6

[56] References Cited

U.S. PATENT DOCUMENTS

| | | | |
|---|---|---|---|
| 2,551,813 | 5/1951 | Pinkney | 260/609 |
| 3,172,892 | 3/1965 | Le Suer et al. | 260/326.5 |
| 3,219,666 | 11/1965 | Norman et al. | 260/268 |
| 3,361,673 | 1/1968 | Stuart et al. | 252/51.5 |
| 3,381,022 | 4/1968 | Le Suer | 260/404.8 |
| 3,461,108 | 8/1969 | Hellman et al. | 260/78.5 |
| 3,560,455 | 2/1971 | Hazen et al. | 260/78.5 |
| 3,560,456 | 2/1971 | Hazen et al. | 260/78.5 |
| 3,560,457 | 2/1971 | Hazen et al. | 260/78.5 |
| 3,580,893 | 5/1971 | Hellman | 260/78.5 T |
| 3,706,704 | 12/1972 | Hellman | 260/78.5 R |
| 3,729,450 | 4/1973 | Galiano et al. | 260/78.5 T |
| 3,729,451 | 4/1973 | Blocke et al. | 260/78.5 R |
| 4,152,499 | 5/1979 | Boerzel et al. | 526/52.4 |
| 4,234,435 | 11/1980 | Meinhardt et al. | 252/51.5 A |
| 4,605,808 | 8/1986 | Samson | 585/525 |
| 5,112,507 | 5/1992 | Harrison | 252/51.5 A |
| 5,175,225 | 12/1992 | Ruhe | 526/272 |

FOREIGN PATENT DOCUMENTS

| | | | |
|---|---|---|---|
| 0264247 | 4/1988 | European Pat. Off. | C10M 129/95 |
| 0355895 | 2/1990 | European Pat. Off. | C08F 8/46 |
| 0503909 | 9/1992 | European Pat. Off. | C08F 255/02 |
| WO88/01290 | 2/1988 | WIPO | C10M 133/44 |
| WO90/03359 | 4/1990 | WIPO | C07C 55/00 |
| WO94/13761 | 6/1994 | WIPO | C10M 129/95 |

*Primary Examiner*—Joseph L. Schofer
*Assistant Examiner*—N Sarofim
*Attorney, Agent, or Firm*—E. A. Schaal

[57] ABSTRACT

Novel copolymers of unsaturated acidic reactants and high molecular weight olefins are useful as dispersants in lubricating oils and fuels and also may be used to prepare polysuccinimides and other post-treated additives useful in lubricating oils and fuels. The ratio of anhydride groups to the hydrocarbon groups in these novel copolymers is at least 1.3.

3 Claims, 2 Drawing Sheets

POLYMERIC DISPERSANTS HAVING POLYALKYLENE AND SUCCINIC GROUPS

This is a divisional of application Ser. No. 0/8165,871, filed Dec. 13, 1993 abandoned.

The present invention relates to compositions that are useful as intermediates for dispersants used in lubricating oil compositions or as dispersants themselves. In addition, some of these compositions are useful in the preparation of novel high molecular weight dispersants that have superior dispersant properties for dispersing sludge and varnish and superior Viton Seal compatibility.

The high molecular weight dispersants of the present invention also advantageously impart fluidity modifying properties to lubricating oil compositions sufficient to allow elimination of some proportion of viscosity index improver from multigrade lubricating oil compositions that contain these dispersants.

BACKGROUND OF THE INVENTION

Alkenyl-substituted succinic anhydrides have been used as dispersants. Such alkenyl-substituted succinic anhydrides have been prepared by various processes, including a thermal process (see, e.g., U.S. Pat. No. 3,361,673) and a chlorination process (see, e.g., U.S. Pat. No. 3,172,892). The polyisobutenyl succinic anhydride ("PIBSA") produced by the thermal process has been characterized as a monomer containing a double bond in the product. Although the exact structure of chlorination PIBSA has not been definitively determined, the chlorination process PIBSAs have been characterized as monomers containing either a double bond, a ring, other than a succinic anhydride ring and/or chlorine in the product. [See J. Weill and B. Sillion, "Reaction of Chlorinated Polyisobutene with Maleic Anhydride:Mechanism Catalysis by Dichloromaleic Anhydride," Revue de I 'Institut Francais du Petrole, Vol. 40, No. 1, pp. 77–89 (January–February, 1985).] Such compositions include one-to-one monomeric adducts (see, e.g., U.S. Pat. Nos. 3,219,666; 3,381,022) as well as adducts having polyalkenyl-derived substituents adducted with at least 1.3 succinic groups per polyalkeny-derived substituent (see, e.g., U.S. Pat. No. 4,234,435).

In addition, copolymers of maleic anhydrides and some aliphatic alpha-olefins have been prepared. The polymers so produced were useful for a variety of purposes, including dispersants for pigments and intermediates in the preparation of polyesters by their reaction with polyols or polyepoxides. However, olefins having more than about 30 carbon atoms were found to be relatively unreactive. (See, e.g., U.S. Pat. Nos. 3,461,108; 3,560,455; 3,560,456; 3,560,457; 3,580,893; 3,706,704; 3,729,450; and 3,729,451).

U.S. Pat. No. 5,112,507 shows copolymers of unsaturated acidic reactants and high molecular weight olefins that are useful as dispersants in lubricating oils and fuels and as intermediates in the preparation of polysuccinimide additives that give excellent deposit control. The ratio of anhydride groups to the hydrocarbon groups in those copolymers is generally 1.0.

SUMMARY OF THE INVENTION

The present invention is a copolymer of an unsaturated acidic reactant and a high molecular weight olefin, the copolymer having a ratio of anhydride groups to the hydrocarbon groups that is at least 1.3. Preferably, the ratio of anhydride groups to the hydrocarbon groups is between 1.3 and 2.0. The copolymer can be formed by reacting the high molecular weight olefin and the unsaturated acidic reactant in the presence of a free radical initiator.

These copolymers are useful as dispersants themselves and also as intermediates in the preparation of other dispersant additives having improved dispersancy and/or detergency properties when employed in a lubricating oil. They do not contain double bonds, rings, other than succinic anhydride rings, or chlorine (in contrast to thermal and chlorination PIBSAs) and as such have improved stability, as well as improved environmental properties due to the absence of chlorine.

Preferably, the unsaturated acidic reactant is of the formula:

wherein X and X' are each independently selected from the group consisting of —OH, —Cl, —O— lower alkyl and when taken together, X and X' are —O—. More preferably, the acidic reactant comprises maleic anhydride.

The high molecular weight olefin has a sufficient number of carbon atoms such that the resulting copolymer is soluble in lubricating oil. The olefin can be an alpha olefin or an alkylvinylidene olefin. Preferably, the high molecular weight olefin is a high molecular weight alkylvinylidene olefin. More preferably, the olefin has at least 1 branch per 2 carbon atoms along the chain. Most preferably, the olefin is polyisobutene having an average molecular weight of 500 to 5000 (more preferably from 900 to 2500), and the alkylvinylidene isomer is methylvinylidene.

In one embodiment, the copolymer has the formula:

wherein n is 1 or greater; either $R_1$ and $R_2$ are hydrogen and one of $R_3$ and $R_4$ is lower alkyl and the other is high molecular weight polyalkyl, or $R_3$ and $R_4$ are hydrogen and one of $R_1$ and $R_2$ is lower alkyl and the other is high molecular weight polyalkyl; and wherein x and y are 1 or greater, such that the sum of x is at least 1.3 times the sum of y for the total mixture. Preferably, the high molecular weight polyalkyl comprises a polyisobutyl group of at least about 50 carbon atoms and the lower alkyl is methyl.

The present invention is also directed to polysuccinimides that are prepared by reacting a copolymer of the present invention with a polyamine having at least one basic nitrogen atom to give a polysuccinimide. Preferably, the polyamine has the formula $H_2N(YNH)_pH$ wherein Y is alkylene of 2 to 6 carbon atoms and p is an integer from 1 to 6. Preferably, the charge mole ratio of polyamine to succinic groups in copolymer is from about 1 to about 0.1. The polysuccinimide can be reacted with a cyclic carbonate or with a boron compound.

Since the copolymers of the present invention contain greater than 1.3 anhydride groups per hydrocarbon groups, polysuccinimides made from these will contain a higher concentration of nitrogen than dispersants made with one anhydride group per hydrocarbon group. This may be advantageous, for example, in controlling engine deposits in automobile engines, or in dispersing soot in diesel engines.

However, in general, dispersants containing higher nitrogen levels are more aggressive towards Viton seals, for example in the VW 3334 test. We have surprisingly found that the polysuccinimides of the present invention perform better in the VW 3334 test than the other dispersants examined, especially at the equal nitrogen level.

In addition the copolymers and polysuccinimides of the present invention contain little if any chlorine (less than 50 ppm). Thus these products are preferable to use from an environmental point of view.

In addition, the present invention is directed to modified polysuccinimides wherein one or more of the nitrogens of the polyamine component is substituted with a hydrocarbyl oxycarbonyl, a hydroxyhydrocarbyl oxycarbonyl or a hydroxy poly(oxyalkylene)-oxycarbonyl. These modified polysuccinimides are improved dispersants and/or detergents for use in fuels or oils.

Accordingly, the present invention also relates to a lubricating oil composition comprising a major amount of an oil of lubricating viscosity and an amount of a copolymer, polysuccinimide or modified succinimide additive of the present invention sufficient to provide dispersancy and/or detergency. The additives of the present invention may also be formulated in lubricating oil concentrates which comprise from about 90 to about 50 weight percent of an oil of lubricating viscosity and from about 10 to about 50 weight percent of an additive of the present invention.

Another composition aspect of the present invention is a fuel composition comprising a major portion of a fuel boiling in a gasoline or diesel range and from about 30 to about 5000 parts per million of copolymer, polysuccinimide or modified succinimide additives. The present invention is also directed to fuel concentrates comprising an inert stable oleophilic organic solvent boiling in the range of about 150° F. to about 400° F. and from about 5 to about 50 weight percent of an additive of the present invention.

BRIEF DESCRIPTION OF THE DRAWINGS

In order to assist the understanding of this invention, reference will now be made to the appended drawings. The drawings are exemplary only, and should not be construed as limiting the invention.

DETAILED DESCRIPTION OF THE INVENTION

Figure 1:
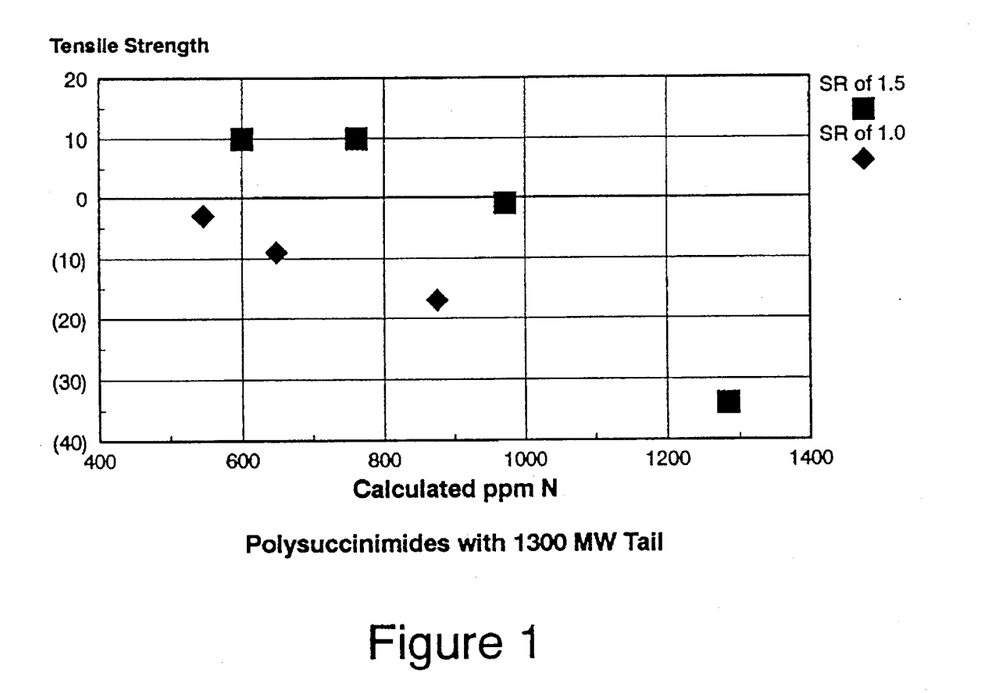
FIG. 1 shows a plot of tensile strength versus calculated ppm N for polysuccinimides with 1300 MW tail.
Figure 2:
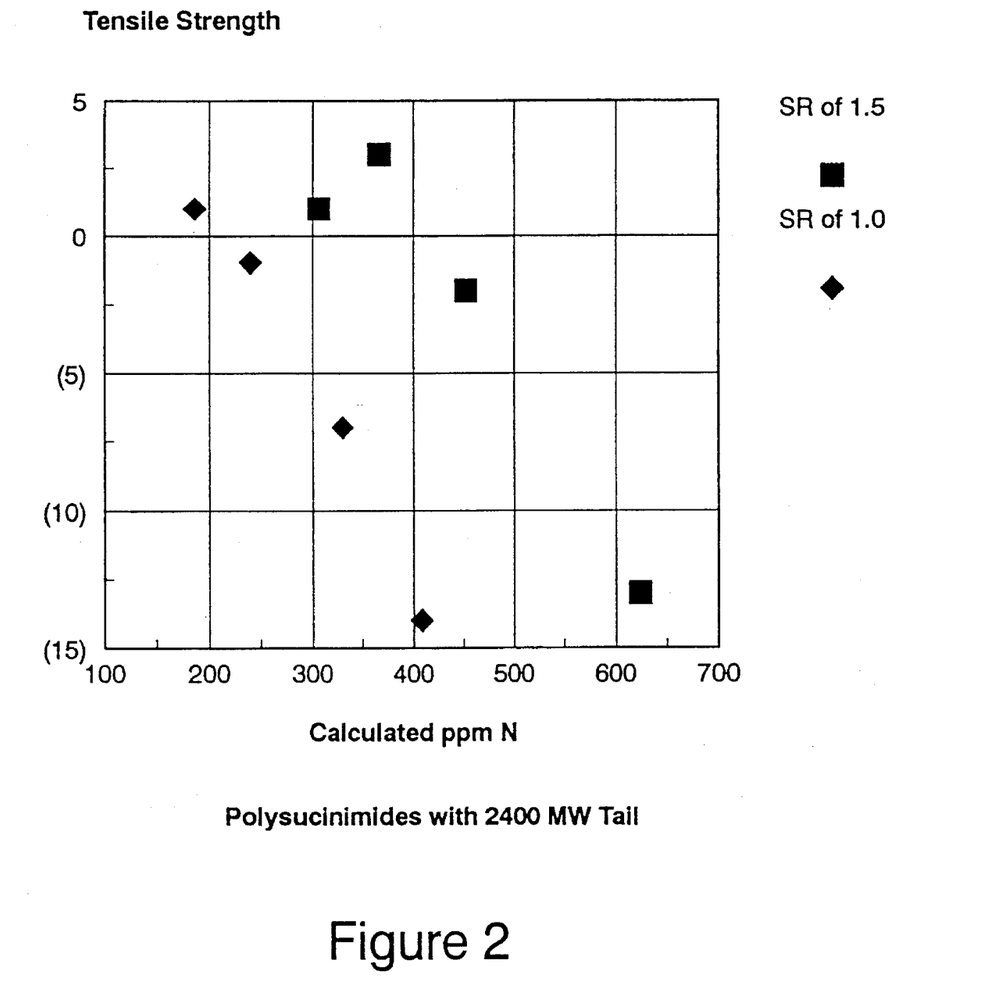
FIG. 2 shows a plot of tensile strength versus calculated ppm N for polysuccinimides with 2400 MW tail.

In its broadest aspect, the present invention encompasses a copolymer of an unsaturated acidic reactant and a high molecular weight olefin, wherein the ratio of anhydride groups to the hydrocarbon groups is at least 1.3. The olefin can be an alpha olefin or alkytvnylidene olefin. The olefin has a sufficient number of carbon atoms such that the resulting copolymer is soluble in lubricating oil.

A. Unsaturated Acidic Reactant

The term "unsaturated acidic reactants" refers to maleic or fumaric reactants of the general formula:

wherein X and X' are the same or different, provided that at least one of X and X' is a group that is capable of reacting to esterify alcohols, form amides or amine salts with ammonia or amines, form metal salts with reactive metals or basically reacting metal compounds and otherwise function to acylate.

Typically, X and X' are —OH, —O—hydrocarbyl, —OM$^+$ where M$^+$ represents one equivalent of a metal, ammonium or amine cation, —NH$_2$, —Cl, —Br, and taken together X and X-can be —O— so as to form an anhydride. Preferably, X and X' are such that both carboxylic functions can enter into acylation reactions. Preferred are acidic reactants where X and X' are each independently selected from the group consisting of —OH, —Cl, —O— lower alkyl and when taken together, X and X' are —O—. Maleic anhydride is the preferred acidic reactant. Other suitable acidic reactants include electron-deficient olefins such as monophenyl maleic anhydride; monomethyl, dimethyl, monochloro, monobromo, monofluoro, dichloro and difluoro maleic anhydride; N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile, and fumaronitrile.

B. High Molecular Weight Olefin

The term "high molecular weight olefins" refers to olefins (including polymerized olefins having a residual unsaturation) of sufficient molecular weight and chain length to lend solubility in lubricating oil to their reaction products. Typically olefins having about 32 carbons or greater (preferably olefins having about 52 carbons or more) suffice.

The term "soluble in lubricating oil" refers to the ability of a material to dissolve in aliphatic and aromatic hydrocarbons such as lubricating oils or fuels in essentially all proportions.

High molecular weight olefins are generally mixtures of molecules having different molecular weights and can have at least one branch per 6 carbon atoms along the chain, preferably at least one branch per 4 carbon atoms along the chain, and particularly preferred that there be about one branch per 2 carbon atoms along the chain. These branched chain olefins may conveniently comprise polyalkenes prepared by the polymerization of olefins of from 3 to 6 carbon atoms, and preferably from olefins of from 3 to 4 carbon atoms, and more preferably from propylene or isobutylene. The addition-polymerizable olefins employed are normally 1-olefins. The branch may be of from 1 to 4 carbon atoms, more usually of from 1 to 2 carbon atoms and preferably methyl.

Preferably, the high molecular weight olefin is a high molecular weight alkylvinylidene olefin, but it can also be an alpha olefin. The preferred alkylvinylidene isomer comprises a methyl- or ethylvinylidene isomer, more preferably the methylvinylidene isomer.

The term "alkylvinylidene" or "alkylvinylidene isomer" refers to high molecular weight olefins and polyalkylene components having the following vinylidene structure wherein R is alkyl or substituted alkyl of sufficient chain length to give the resulting molecule solubility in lubricating oils and fuels, thus R generally has at least about 30 carbon atoms, preferably at least about 50 carbon atoms and Rv is lower alkyl of about 1 to about 6 carbon atoms.

The term "alpha olefin" refers to high molecular weight olefins and polyalkylene components having the following structure wherein R is alkyl or substituted alkyl of sufficient chain length to give the resulting molecule solubility in lubricating oils and fuels, thus R generally has at least about 30 carbon atoms, preferably at least about 50 carbon atoms.

As used herein, the term "succinic ratio" refers to the average number of succinic groups per polyolefin group in the alkenyl or alkyl succinic anhydride reaction product of maleic anhydride and polyolefin. For example, a succinic ratio of 1.0 indicates an average of one succinic group per polyolefin group in the alkenyl or alkyl succinic anhydride product. Likewise, a succinic ratio of 1.35 indicates an average of 1.35 succinic groups per polyolefin group in the alkenyl or alkyl succinic anhydride product, and so forth.

The succinic ratio can be calculated from the saponification number (mg KOH per gram of sample), the actives content of the alkenyl or alkyl succinic anhydride product and the molecular weight of the starting polyolefin. The actives content of the alkenyl or alkyl succinic anhydride product is measured in terms of the actives fraction, wherein an actives fraction of 1.0 is equivalent to 100 weight percent actives. Accordingly, an actives fraction of 0.5 would correspond to 50 weight percent actives.

The succinic ratio of the alkenyl or alkyl succinic anhydride product of maleic anhydride and polyolefin can be calculated in accordance with the following equation:

$$\text{Succinic ratio} = \frac{M_{po} \times P}{(C \times A) - (M_{ma} \times P)}$$

wherein

P=saponification number of the alkenyl or alkyl succinic anhydride sample (mg KOH/g)

A=actives fraction of the alkenyl or alkyl succinic anhydride sample

Mpo=number average molecular weight of the starting polyolefin

Mma=98 (molecular weight of maleic anhydride)

C=conversion factor=112220 (for conversion of gram-moles of alkenyl or alkyl succinic anhydride per gram of sample to milligrams of KOH per gram of sample)

The saponification number, P, can be measured using known procedures, such as the procedure described in ASTM D94.

The actives fraction of the alkenyl or alkyl succinic anhydride can be determined from the percent of unreacted polyolefin according to the following procedure. A 5.0 gram sample of the reaction product of maleic anhydride and polyolefin is dissolved in hexane, placed in a column of 80.0 grams of silica gel (Davisil 62, a 140 angstrom pore size silica gel), and eluted with 1 liter of hexane. The percent unreacted polyolefin is determined by removing the hexane solvent under vacuum from the eluent and weighing the residue. Percent unreacted polyolefin is calculated according to the following formula:

The weight percent actives for the alkenyl or alkyl succinic anhydride product is calculated from the percent unreacted polyolefin using the formula:

Weight Percent Actives = 100 − Percent Unreacted Poyolefin

The actives fraction of the alkenyl or alkyl succinic anhydride is then calculated as follows:

$$\text{Actives Fraction} = \frac{\text{Weight Percent Actives}}{100}$$

The especially preferred high molecular weight olefins used to prepare the copolymers of the present invention are polyisobutenes which comprise at least about 20% of the more reactive methylvinylidene isomer, preferably at least 50% and more preferably at least 70%. Suitable polyisobutenes include those prepared using $BF_3$ catalysis. The preparation of such polyisobutenes in which the methylvinylidene isomer comprises a high percentage of the total composition is described in U.S. Pat. Nos. 4,152,499 and 4,605,808.

Preferred are polyisobutenes having average molecular weights of about 500 to about 5000. Especially preferred are those having average molecular weights of about 900 to about 2500.

C. Copolymer

The copolymers of the present invention are prepared by reacting a high molecular weight olefin and an unsaturated acidic reactant in the presence of a free radical initiator. Preferably, at least about 20% of the total olefin composition comprises the alkylvinylidene isomer.

The copolymers of the present invention differ from the copolymers disclosed in U.S. Pat. No. 5,112,507 in that the ratio of anhydride groups to the hydrocarbon groups in the present invention is at least 1.3. Preferably, the ratio is between 1.3 and 2.0.

Copolymers of an olefin, including high molecular weight olefins with an unsaturated acidic reactant are well known in the art (U.S. Pat. Nos. 3,461,108; 3,560,455; 3,560,456; 3,560 457; 3,580,893; 3,706,704; 3,729,450; 3,729,451; and 5,112,507). As reported by Trivedi and Culbertson in "Maleic Anhydride: 1982," Plenum Press, pg 288, as a rule, olefin-maleic anhydride copolymerizations, run in the presence of free radical initiators, give only equimolar copolymers. Moreover, conditions are known where random copolymers may be prepared that contain less than equimolar amounts of maleic anhydride. However, copolymers that contain greater than 1.3 anhydride groups per hydrocarbon group are less well known. Surprisingly, during the course of our studies we have now found how to produce these desirable materials.

What is required is to use an unsaturated acidic reagent to polyolefin charge mole ratio (CMR) of greater than 1.3:1 and a sufficient temperature of reaction to produce a ratio of anhydride groups to hydrocarbon group of at least 1.3: 1. The greater the CMR the greater the likelihood of producing a product with greater than 1.3 anhydride groups per hydrocarbon chain. In addition the temperature of the reaction of an unsaturated acidic reagent with an olefin is an important factor. For example, at a CMR of 2.0, a higher ratio of anhydride groups to hydrocarbon chain is obtained at 160° C. than at 130° C. The CMR and temperature of the reaction can vary over a wide range such that the combination of CMR and temperature is sufficient to produce the desired result.

Since the high molecular weight olefins used to prepare the copolymers of the present invention are generally mixtures of individual molecules of different molecular weights, individual copolymer molecules resulting will generally contain a mixture of high molecular weight polyalkyl groups of varying molecular weight.

The copolymers of the present invention have the general formula:

wherein W' and Z' are independently selected from the group consisting of —OH, —O— lower alkyl or taken together are —O— to form a succinic anhydride group, n is one or greater, and $R_1$, $R_2$, $R_3$ and $R_4$ are selected from hydrogen, lower alkyl of about 1 to 6 carbon atoms and higher molecular weight polyalkyl wherein x and y are 1 or greater, such that the sum of x is at least 1.3 times the sum of y for the total mixture. Either $R_1$ and $R_2$ are hydrogen and one of $R_3$ and $R_4$ is lower alkyl or hydrogen and the other is high molecular weight polyalkyl, or $R_3$ and $R_4$ are hydrogen and one of $R_1$ and $R_2$ is lower alkyl or hydrogen and the other is high molecular weight polyalkyl. The variables x and y can vary over the length of the polymer.

The term "high molecular weight polyalkyl" refers to polyalkyl groups of sufficient molecular weight and hydrocarbyl chain length that the products prepared having such groups are soluble in lubricating oil. Typically these high molecular weight polyalkyl groups have at least about 30 carbon atoms, preferably at least about 50 carbon atoms. These high molecular weight polyalkyl groups may be derived from high molecular weight olefins.

In a preferred embodiment, when maleic anhydride is used as the unsaturated acidic reactant, the reaction produces copolymers predominately of the following formula:

wherein n is about 1 to about 100, preferably about 2 to about 20, more preferably 2 to 10, and $R_1$, $R_2$, $R_3$ and $R_4$ are selected from hydrogen, lower alkyl of about 1 to 6 carbon atoms and higher molecular weight polyalkyl wherein x and y are 1 or greater, such that the sum of x is at least 1.3 times the sum of y for the total mixture. Either $R_1$ and $R_2$ are hydrogen and one of $R_3$ and $R_4$ is lower alkyl and the other is high molecular weight polyalkyl, or $R_3$ and $R_4$ are hydrogen and one of $R_1$ and $R_2$ is lower alkyl and the other is high molecular weight polyalkyl. The variables x and y can vary over the length of the polymer.

Preferably, the high molecular weight polyalkyl group has at least about 30 carbon atoms (more preferably at least about 50 carbon atoms). Preferred high molecular weight polyalkyl groups include polyisobutyl groups. Preferred polyisobutyl groups include those having average molecular weights of about 500 to about 5000, more preferably from about 900 to about 2500. Preferred lower alkyl groups include methyl and ethyl; especially preferred lower alkyl groups include methyl.

Generally, such copolymers contain an initiator group, I, and a terminator group, T, as a result of the reaction with the free radical initiator used in the polymerization reaction. In such a case, the initiator and terminator groups may be where $R_7$ is hydrogen, alkyl, aryl, alkaryl, cycloalkyl, alkoxy, cycloalkoxy, acyl, alkenyl, cycloalkenyl, alkynyl; or alkyl, aryl or alkaryl optionally substituted with 1 to 4 substituents independently selected from nitrile, keto, halogen, nitro, alkyl, aryl, and the like. Alternatively, the initiator group and/or terminator group may be derived from the reaction product of the initiator with another material such as solvent; for example, the initiator may react with toluene to produce a benzyl radical.

The copolymers of the present invention differ from the PIBSAs prepared by the thermal process in that the thermal process products contain a double bond and a singly substituted succinic anhydride group. The copolymers of the present invention differ from the PIBSAs prepared by the chlorination process, since those products contain a double bond, a ring, other than a succinic anhydride ring or one or more chlorine atoms. The copolymers of the present invention differ from the copolymers of unsaturated acidic reactants and high molecular weight olefins in that ratio of anhydride groups to hydrocarbon groups is at least 1.3:1.

As noted above, the copolymers of the present invention are prepared by reacting a reactive high molecular weight olefin and an unsaturated acidic reactant in the presence of a free radical initiator. The reaction may be conducted at a temperature of about −30° C. to about 210° C., preferably from about 120° C. to about 180° C.

The reaction may be conducted neat, that is, both the high molecular weight olefin, and acidic reactant and the free radical initiator are combined in the proper ratio, and then stirred at the reaction temperature.

Alternatively, the reaction may be conducted in a diluent. For example, the reactants may be combined in a solvent. Suitable solvents include those in which the reactants and free radical initiator are soluble and include acetone, tetrahydrofuran, chloroform, methylene chloride, dichloroethane, toluene, dioxane, chlorobenzene, xylenes, or the like. After the reaction is complete, volatile components may be stripped off. When a diluent is employed, it is preferably inert to the reactants and products formed and is generally used in an amount sufficient to ensure efficient stirring.

The reaction solvent, as noted above, must be one that dissolves both the acidic reactant and the high molecular weight olefin. It is necessary to dissolve the acidic reactant and high molecular weight olefin so as to bring them into intimate contact in the solution polymerization reaction. It has been found that the solvent must also be one in which the resultant copolymers are soluble.

Suitable solvents include liquid saturated or aromatic hydrocarbons having from six to 20 carbon atoms; ketones having from three to five carbon atoms; and liquid saturated aliphatic dihalogenated hydrocarbons having from one to five carbon atoms per molecule, preferably from one to three carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the acidic reactant and high molecular weight olefin in addition to the resulting copolymers. The volume ratio of solvent to high molecular weight olefin is suitably between 1:1 and 100:1 and is preferably between 1.5:1 and 4:1.

Suitable solvents include the ketones having from three to six carbon atoms and the saturated dichlorinated hydrocarbons having from one to five, more preferably one to three, carbon atoms.

Examples of suitable solvents include, but are not limited to:
1. ketones, such as: acetone; methylethylketone; diethylketone; and methylisobutylketone;
2. aromatic hydrocarbons, such as: benzene; xylene; and toluene;
3. saturated dihalogenated hydrocarbons, such as: dichloromethane; dibromomethane; 1-bromo-2-chloroethane; 1,1-dibromoethane; 1,1-dichloroethane; 1,2-dichloroethane; 1,3-dibromopropane; 1,2-dibromopropane; 1,2-dibromo-2-methylpropane; 1,2-dichloropropane; 1,1-dichloropropane; 1,3-dichloropropane; 1-bromo-2-chloropropane; 1,2-dichlorobutane; 1,5-dibromopentane; and 1,5-dichloropentane; or
4. mixtures of the above, such as: benzenemethylethylketone.

The reaction can also be carried out using a process similar to the one described by U.S. Pat. 5,175,225 where the oligomeric copolymer, which is the reaction product of the unsaturated acidic reactant and the high molecular weight olefin, is used as a "solvent" for the unsaturated acidic reactant, free radical initiator, and the high molecular weight olefin. In this process, the unsaturated acidic reactant, free radical initiator, and high molecular weight olefin are added to a sufficient amount of oligomeric copolymer to afford solubility of the reactants.

In addition copolymerization can be accomplished in the presence of dispersing agents. This copolymerization is called suspension copolymerization.

A charge mole ratio (CMR) greater than 1.3 is required to produce the copolymers of this invention. The CMR is defined as the ratio of the number of moles of maleic anhydride to the number of moles of polybutene.

In addition the temperature of reaction must be sufficient to facilitate the production of copolymer with a succinic ratio greater than 1.3. Generally, temperatures in excess of about 110° C. are required. However, the temperature required to produce a copolymer with a succinic ratio greater than 1.3 is also dependent on the CMR and the concentration. In general, the higher the CMR and the more concentrated the reaction mixture, the lower the temperature of reaction that is required to produce a copolymer with greater than a 1.3 succinic ratio.

In general, the copolymerization can be initiated by any free radical initiator. Such initiators are well known in the art. However, the choice of free radical initiator may be influenced by the reaction temperature employed.

The preferred free-radical initiators are the peroxide-type polymerization initiators and the azo-type polymerization initiators. Radiation can also be used to initiate the reaction, if desired.

The peroxide-type free-radical initiator can be organic or inorganic, the organic having the general formula: $R_3OOR_3'$ where $R_3$ is any organic radical and $R_3'$ is selected from the group consisting of hydrogen and any organic radical. Both $R_3$ and $R_3'$ can be organic radicals, preferably hydrocarbon, aroyl, and acyl radicals, carrying, if desired, substituents such as halogens, etc. Preferred peroxides include di-tert-butyl peroxide, tert-butyl peroxybenzoate, and dicumyl peroxide.

Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by alpha,alpha'-azobisisobutyronitrile, are also well-known free-radical promoting materials. These azo compounds can be defined as those having present in the molecule group —N=N wherein the balances are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azomethane and phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the high molecular olefin used and the reaction conditions. The initiator must, of course, be soluble in the reaction medium. The usual concentrations of initiator are between 0.001:1 and 0.2:1 moles of initiator per mole of acidic reactant, with preferred amounts between 0.005:1 and 0.10:1.

The polymerization temperature must be sufficiently high to decompose the initiator to produce the desired free-radicals. A suitable initiator is ditertiarybutyl peroxide, which decomposes at a sufficient rate over the temperature range of 120° to 180° C.

The reaction pressure should be sufficient to maintain the solvent and the free radical initiator in the liquid phase. Pressures can therefore vary between about atmospheric and 100 psig or higher The reaction time is usually sufficient to result in the substantially complete conversion of the acidic reactant and high molecular weight olefin to copolymer. The reaction time is suitable between one and 24 hours, with preferred reaction times between two and ten hours.

The copolymer is conveniently separated from solvent and unreacted acidic reactant by conventional procedures such as phase separation, solvent distillation, precipitation and the like. If desired, dispersing agents and/or cosolvents may be used during the reaction.

The isolated copolymer may then be reacted with a polyamine to form a polymeric succinimide. The preparation and characterization of such polysuccinimides and their treatment with other agents to give other dispersant compositions is described herein.

Preferred copolymers include those prepared using a polyisobutene of average molecular weight of about 500 to about 5000, preferably of about 950 to about 2500 and wherein at least about 50 percent of the total polyisobutene comprises the alkylvinylidene isomer. Preferred alkylvinylidene isomers include methylvinylidene and ethylvinylidene. Especially preferred is methylvinylidene. Particularly preferred copolymers have an average molecular weight of about 900 to about 2500.

D. Polysuccinimides

The copolymer of the present invention can be reacted with a polyamine having at least one basic nitrogen atom to form polyamino polysuccinimides. Polysuccinimides that may be prepared include monopolysuccinimides, bis-polysuccinimides, higher succinimides, or mixtures thereof. The polysuccinimides produced may depend on the charge mole ratio of polyamine to succinic groups in the copolymer molecule and the particular polyamine used. Charge mole ratios of polyamine to succinic group in copolymer of about 1:1 may produce predominately monopolysuccinimide. Charge mole ratios of polyamine to succinic group in copolymer of about 1:2 may produce predominately bis-polysuccinimide. Higher polysuccinimides may be produced if there is branching in the polyamine so that it may react with a succinic group from each of greater than two copolymer molecules. Preferably, the charge mole ratio of polyamine to succinic groups in copolymer is from about 1:1 to about 0.1:1.

The preparation of polyamino polysuccinimides by reacting copolymers with a polyamine is fully described in U.S. Pat. No. 5,112,507, which is hereby incorporated by reference for all purposes. Reference is made to U.S. Pat. 5,112,507 for a full description of preparation procedures for producing polysuccinimides.

The polyamine employed to prepare the polyamino polysuccinimides is preferably polyamine having from 2 to about 12 amine nitrogen atoms and from 2 to about 40 carbon atoms. The polyamine is so selected so as to provide at least one basic amine per succinimide group. The polyamine preferably has a carbon-to-nitrogen ratio of from about 1:1 to about 10:1.

The more preferred polyamines employed in this reaction are generally represented by the formula:

$H_2N(YNH)_aH$ wherein Y is an alkylene group of 2 to 10 carbon atoms, preferably from 2 to 6 carbon atoms, and a is an integer from about 1 to 11, preferably from 1 to 6. However, the preparation of these alkylene polyamines does not produce a single compound and cyclic heterocycles, such as piperazine, may be included to some extent in the alkylene diamines. Reference is made to U.S. Pat. 5,112,507 for a full description of preferred polyamines.

Preferred monopolysuccinimides include those having the following formula:

wherein Am is a linking group having from 0 to 10 amine nitrogen atoms and from 2 to 40 carbon atoms; n is 1 or greater; $R_5$ and $R_6$ are independently hydrogen, lower alkyl of 1 to 6 carbon atoms, phenyl or taken together are alkylene of 3 to 6 carbon atoms to give a ring; and wherein x and y are 1 or greater, such that the sum of x is at least 1.3 times the sum of y for the total mixture. $R_1$, $R_2$, $R_3$, and $R_4$ are selected so that either $R_1$ and $R_2$ are hydrogen and one of $R_3$ and $R_4$ is lower alkyl and the other is high molecular weight polyalkyl, or $R_3$ and $R_4$ are hydrogen and one of $R_1$ and $R_2$ is lower alkyl and the other is high molecular weight polyalkyl.

Preferred polysuccinimides include those which partially comprise at least in part a bis-polysuccinimide structure. Some of these preferred polysuccinimides are random polysuccinimides that comprise units selected from:

and wherein Am is a linking group having from about 0 to 10 amine nitrogen atoms and from about 2 to 40 carbon atoms; $R_1$, $R_2$, $R_3$, $R_4$, $R_1'$, $R_2'$, $R_3'$, $R_4'$, $R_1''$, $R_2''$, $R''$, and $R_4''$ are selected from hydrogen, lower alkyl of one to 6 carbon atoms and high molecular weight polyalkyl, wherein x, y, and y' are 1 or greater, such that the sum of x is at least 1.3 times the combined sum of y and y' for the total mixture; and a, a', b and b' are sites for a covalent bond; provided that at least one a or a' site of each unit is covalently bonded to a b or b' site. Either $R_1$ and $R_2$ are hydrogen and one of $R_3$ and $R_4$ is lower alkyl and the other is polyalkyl, or $R_3$ and $R_4$ are hydrogen and one of $R_1$ and $R_2$ is lower alkyl and the other is polyalkyl; either $R_1'$ and $R_2'$ are hydrogen and one of $R_3'$ and $R_4'$ is lower alkyl and the other is polyalkyl, or $R_3'$ and $R_4'$ are hydrogen and one of $R_1'$ and $R_2'$ is lower alkyl and the other is polyalkyl; and either $R_1''$ and $R_2''$ are hydrogen and one of $R_3''$ and $R_4''$ is lower alkyl and the other is polyalkyl or $R_3''$ and $R_4''$ are hydrogen and one of $R_1''$ and $R2''$ is lower alkyl and the other is polyalkyl and $R_5$ and $R_6$ are independently hydrogen, lower alkyl of 1 to 6 carbon atoms. phenyl or taken together are alkylene of 3 to 6 carbon atoms to give a ring.

Preferred high molecular weight polyalkyl groups include polyisobutyl groups having at least about 30 carbon atoms, more preferably, at least about 50 carbon atoms. Especially preferred are polyisobutyl groups having an average molecular weight of about 500 to about 5000, more preferably from about 900 to about 2500.

Preferred lower alkyl groups include methyl and ethyl. Especially preferred are compounds where the lower alkyl group is methyl.

Preferred are compounds where $R_5$ and $R_6$ are hydrogen or methyl. Especially preferred $R_5$ and $R_6$ groups include hydrogen.

Preferred are Am groups having from about 0 to about 10 amine nitrogen atoms and from about 2 to about 40 carbon atoms. More preferred are Am groups of the formula —[(ZNH)$_p$Z']— wherein Z and Z' are independently alkylene of from about 2 to about 6 carbon atoms and p is an integer from 1 to 6. Especially preferred are Am groups where Z and Z' are ethylene and p is 2, 3 or 4.

Preferred are random polysuccinimides where the average sum of A and B units is from about 2 to about 50. Preferred are random polysuccinimides having molecular weights of from about 10,000 to about 150,000. Preferred are compounds in which the bis-succinimide structure predominates, that is, those having more B units than A units, preferably on the order of about 2 to about 10 times as many B units as A units. Such compounds are preferred in part due to their high average molecular weights, on the order of about 10,000 to about 150,000, which may be related to their exhibiting an advantageous V.I. credit as well as dispersantability when used in a lubricating oil composition.

Higher polysuccinimides are prepared by reacting the copolymers of the present invention with a polyamine having branching such that it can react with a succinic group from each of greater than two copolymer molecules. Due to this crosslinking, it is believed that these higher polysuccinimides may have gel-like properties besides the dispersant properties possessed by the other polysuccinimides.

A polysuccinimide having at least one primary or secondary amine group can be reacted with a cyclic carbonate or it can be reacted with a boron compound, such as boron oxide, boron halide, boric acid or esters of boric acid. Reference is made to U.S. Pat. 5, 112,507 for a full description of those post treatments.

The copolymers, polysuccinimides and modified polysuccinimides of this invention are useful as detergent and dispersant additives when employed in lubricating oils and lubricating oil concentrates. The lubricating oil composition has an oil of lubricating viscosity and a dispersant effective amount of the copolymers, polysuccinimides or modified polysuccinimides. The lubricating oil concentrate has from 90 to 50 weight percent of an oil of lubricating viscosity and from 10 to 50 weight percent of copolymers, polysuccinimides or modified polysuccinimides. Other additives which may be present in the formulation include rust inhibitors, foam inhibitors, corrosion inhibitors, metal deactivators, pour point depressants, antioxidants, V.I. improvers (either dispersant or nondispersant), and a variety of other well-known additives. It is also contemplated the additives of this invention may be employed as dispersants and detergents in hydraulic fluids, marine crankcase lubricants and the like.

Also, the copolymers, polysuccinimides and modified polysuccinimides of this invention are useful in fuel compositions and fuel concentrates. The fuel composition has a hydrocarbon boiling in a gasoline or diesel range and from 30 to 5000 parts per million of copolymers, polysuccinimides or modified polysuccinimides. The fuel concentrate has an inert stable oleophilic organic solvent boiling in the range of 150° F. to 400° F. and from 5 to 50 weight percent copolymers, polysuccinimides or modified polysuccinimides.

EXAMPLES

The invention will be further illustrated by following examples, which set forth particularly advantageous method embodiments. While the Examples are provided to illustrate the present invention, they are not intended to limit it.

Example 1

Preparation of a Copolymer From Maleic Anhydride and Polybutene With 1300 Molecular Weight and a CMR of 2.0.

To a 22 L, 3 neck flask equipped with a stirrer, condenser and heating mantle was added 12068 g (9.28 mol) polybutene of 1300 molecular weight, and about 70% methylvinylidene content (Glissopal EC 3251 ). This was heated to 110° C. To this was added maleic anhydride (1820 g, 18.57 mol). The maleic anhydride/polybutene charge mole ratio was 2.0. The mixture was heated to 160° C. and di-t-butylperoxide (67.74 g, 0.464 mol) was added dropwise over a five hour period. Then an additional amount of di-t-butylperoxide (33.87 g, 0.232 mol) was added dropwise over five hours and the reaction was heated an additional 5 hours at 160° C. The di-t-butylperoxide/polybuene charge mole ratio was 0.075. The reaction was then heated to 200° C. and excess maleic anhydride removed in a vacuum. To this product was then added 100 N diluent oil (2310 g). The material was filtered to give a product with a SAP number of 56.6 mg KOH/g sample. (SAP number was determined by using ASTM procedure D94-80.) The succinic ratio was calculated to be 1.5. This product contained 50% active material.

Example 2

Preparation of a Copolymer From Maleic Anhydride and Polybutene With 2400 Molecular Weight and a CMR of 2.0.

The procedure in Example one was repeated except that instead of using polybutene of 1300 molecular weight, 8310 g (3.46 mol) polybutene of 2400 molecular weight, (Glissopal EC 3252), was used. In this example the maleic anhydride/polybutene charge mole ratio was 2.0 and the di-t-butylperoxide/polybutene charge mole ratio was 0.05. Half of the maleic anhydride (169.54 g, 1.73 mol) and one quarter of the di-t-butylperoxide (6.32 g, 0.043 mol) was added initially. The rest of the maleic anhydride and di-t-butylperoxide was added after 5 hours of heating. After the completion of the reaction the excess maleic anhydride was removed at 200° C. in a vacuum, 3780 g diluent oil was added and the product was filtered. This product had a SAP number of 26.4 mg KOH/g sample and contained 40% actives. The succinic ratio was calculated to be 1.5.

Example 1 and 2 show that a copolymer with a succinic ratio of 1.5 is produced in good yield over a range of polybutene molecular weights (1300 to 2400) at 160° C reaction temperature and a CMR of 2.0.

Example 3

Preparation of a Copolymer From Maleic Anhydride and Polybutene With 1300 Molecular Weight Using a CMR of 1.0.

To a 500 ml 3-neck flask fitted with a thermometer, condenser, mechanical stirrer, and heating mantle was added 130 g Ultravis 30 (0.1 mol), 100 g 1,1,2,2-tetrachloroethane, and 9.8 g maleic anhydride (0.1 mol). The Ultravis 30 contained about 65% methylvinylidene content. This was heated to 100° C. and after one hour di-t-butylperoxide (1.46 g, 0.01 mol) was added and the temperature rose to 140° C. This was heated overnight. Then the 1,1,2,2-tetrachloroethane was removed in a vacuum. The residue was dissolved in hexane and filtered to remove unreacted maleic anhydride. The hexane was removed in a vacuum. The product had a SAP number of 45.0 and contained 59.3% actives. The succinic ratio was calculated to be 1.0.

Example 3 shows that when a CMR of 1.0 was used and a temperature of 140° C. was used a copolymer with a succinic ratio greater than 1.3 was not produced.

Example 4

Preparation of a Copolymer From Maleic Anhydride and Polybutene With 1300 Molecular Weight Using a CMR of 0.33.

The procedure of Example 3 was repeated exactly except that 0.15 mol polybutene and 0.05 mol maleic anhydride was used. This product had a SAP number of 15.0 mg KOH/g sample and contained 31.7% actives. The succinic ratio was calculated to be 0.6.

Example 4 shows that when a CMR of 0.33 was used at a temperature of 140° C. a copolymer with a succinic ratio greater than 1.3 was not produced.

Example 5

Preparation of a Copolymer From Maleic Anhydride and Polybutene with 1300 Molecular Weight Using a CMR of 3.0.

The procedure of Example 3 was repeated exactly except that 0.05 mol polybutene and 0.15 mol maleic anhydride was used. This product had a SAP number of 78.1 mg KOH/g sample and contained 67% actives. The succinic ratio was calculated to be 1.5.

Example 5 shows that when a CMR of 3.0 was used at a temperature of 140° C a copolymer with a succinic ratio of 1.5 was produced.

Example 6

Preparation of a Copolymer From Maleic Anhydride and Polybutene with 1300 Molecular Weight With a CMR of 3.0 Using a Di-T-Amyl peroxide.

The procedure of Example 5 was repeated exactly except that di-t-amylperoxide (1.74 g, 0.01 mol) was used instead of di-t-butylperoxide. The product from this reaction had a SAP number of 82.1 mg KOH/g sample and contained 65% actives. The succinic ratio was calculated to be 1.6.

Example 6 shows that other initiators besides di-t-butylperoxide can be used.

Example 7

Preparation of a Copolymer From Maleic Anhydride and Polybutene with 1300 Molecular Weight With a CMR of 3.0 Using T-Butylperoctoate at 84° C.

To a 500 ml 3-necked flask equipped with a mechanical stirrer, condenser, thermometer, and heating mantle was added 65 g (0.05 mol) Ultravis 30 (containing about 65% methylvinylidene content), 14.7 g (0.15 mol) maleic anhydride, and 100 g 1,2-dichloroethane. This was heated to 60° C. and to this was added 2.19 g (0.01 mol) t-butylperoctoate. The mixture was heated to 84° C. and heated overnight. Then the solvent was removed in a vacuum. The product was dissolved in hexane and filtered to remove unreacted maleic anhydride. The hexane was removed in a vacuum. The product had a SAP number of 54.6 mg KOH/g sample, and contained 65% actives. The succinic ratio was calculated to be only 1.1.

Example 7 shows that when the temperature of reaction is 84° C. using a CMR of 3.0, a copolymer with a succinic ratio greater than 1.3 was not produced.

Example 8

Preparation of a Copolymer From Maleic Anhydride and Polybutene With 2400 Molecular Weight with a CMR of 2.0 in 100 Neutral Oil as Diluent at 130° C.

To a 2 L 3-neck flask equipped with a thermometer, mechanical stirrer, and heating mantle was added 480 g (0.2 mol) Glissopal ES 3252 (2400 molecular weight and 70% methylvinylidene content), 39.2 g (0.4 mol) maleic anhydride, and 100 g 100 neutral diluent oil (Chevron 100NR). This was heated to 80° C. and to this was added 2.92 g (0.02 mol) di-t-butylperoxide. The temperature was increased to 130° C. and heated overnight. Then the excess maleic anhydride was removed in a vacuum. The product was dissolved in hexane and filtered. The hexane was removed in a vacuum. A product was obtained that had a SAP number of 27.8 mg KOH/g sample and contained 50% actives. The succinic ratio was calculated to be 1.2.

Example 8 shows that 100 neutral oil is a satisfactory diluent oil for the reaction. The succinic ratio was less than 1.3, however, due to a combination of low CMR (2.0) and temperature (130° C).

Example 9

Preparation of a Copolymer From Maleic Anhydride and Polybutene With 2400 Molecular Weight With a CMR of 2.0 in 100 Neutral Oil as Diluent at 160° C.

The procedure of Example 8 was repeated exactly except that 160° C was used. This product had a SAP number of 40.9 mg KOH/g sample and contained 53.2% actives. The succinic ratio was calculated to be 1.8.

This experiment shows that in order to get a copolymer with a succinic ratio greater than 1.3 using a CMR of 2.0 and 100 neutral oil as diluent, a temperature of about 160° C. was needed.

Example 10

Preparation of a Polysuccinimide Using the Copolymer From Example 1, and DETA as the Polyamine.

To a 1 L 3-neck flask equipped with a mechanical stirrer, thermometer, Dean Stark trap, condenser and a heating mantle was added 300.69 g (0.1517 mol of succinic groups) of the copolymer of Example 1. This was heated to 140° C. and to this was added 13.61 g DETA (0.1319 mol). The DETA/copolymer CMR was 0.87. This was heated to 160° C. for about 7 hours collecting the water in the Dean Stark trap as the reaction proceeded. The polysuccinimide product was analyzed and found to contain 1.63% N, a TBN of 23.7, and a viscosity at 100° C. of 2696 cSt. The succinic ratio was 1.5.

Examples 11–17

Preparation of Polysuccinimides Using Different CMRs and Different Polyamines

The procedure of Example 10 was followed exactly except that different polyamine/copolymer CMRs and different polyamines were used. The products produced are reported in Table 1. The succinic ratio was 1.5.

Example 18

Preparation of a Post Treated Polysuccinimide Using a Cyclic Carbonate

To a 1 L 3-neck flask equipped with a mechanical stirrer, condenser, Dean Stark trap, and mechanical stirrer was added 311.3 g of the bis DETA PIBSA 1300 polysuccinimide from Example 14. This was heated to 160° C. and to this was added 23.5 g ethylene carbonate (0.267 mol). This was heated at 160° C. overnight. The post treated polysuccinimide was analyzed and found to contain 1.02% N, a TBN of 8.9, and a viscosity at 100C of 2687 cSt.

Example 19

Preparation of Post Treated Polysuccinimide Using TETA as the Polyamine

The procedure of Example 18 was repeated except that 313.5 g of the bis TETA PIBSA 1300 polysuccinimide from Example 15 was used. This was reacted with 30.0 g (0.34 mol) ethylene carbonate. The properties of this product are reported in Table 1.

Example 20

Preparation of Post Treated Polysuccinimide Using TEPA as the Polyamine

The procedure of Example 18 was repeated except that 316.2 g of the bis TEPA PIBSA 1300 polysuccinimide from Example 16 was used. This was reacted with 38.6 g (0.439 mol) ethylene carbonate. The properties of this product are reported in Table 1.

Example 21

Preparation of Post Treated Polysuccinimide Using HPA as the Polyamine.

The procedure of Example 18 was repeated except that 326.8 g of the his HPA PIBSA 1300 polysuccinimide from Example 17 was used. This was reacted with 62.8 g (0.714 mol) ethylene carbonate. The properties of this product are reported in Table 1.

Example 22

Preparation of a Polysuccinimide Using the Copolymer From Example 2 and DETA as the Polyamine To a 500 ml 3-neck flask equipped with a mechanical stirrer, Dean Stark trap, condenser, thermometer, and heating mantle was added 200.0 g of the copolymer from Example 2 (0.047 mol of succinic groups). The reaction was heated to 110° C. and to this was added DETA (4.22 g, 0.041 mol). The DETA/copolymer CMR was 0.87. The reaction was heated to 160° C. for 5 hours. The product was analyzed and found to contain 0.77% N, TBN of 16.07, a TAN of 1.34, and a viscosity at 100° C. of 1317 cSt. The succinic ratio was 1.5

Examples 23–29

Preparation of Polysuccinimides Using Different CMRs and Different Polyamines

The procedure of Example 22 was repeated except that different polyamines and different polyamine/copolymer CMRs were used. The analytical data for these compounds are reported in Table 1. The succinic ratio was 1.5.

Example 30

Preparation of Post Treated Polysuccinimide Using a Cyclic Carbonate

To a 500 ml 3-neck flask equipped with a mechanical stirrer, thermometer, condenser and heating mantle was added 200 g of the bis DETA polysuccinimide from Example 26. This was heated to 165° C. and to this was added ethylene carbonate 4.27 g (0.0486 mol). The ethylene carbonate/basic nitrogen CMR for this reaction was 2.0. This was heated at 165° C. for 5 hours. The product was analyzed and found to contain 0.49% N, TBN of 4.87, a TAN of 0.22 and a viscosity at 100° C. of 1350 cSt.

Examples 31–33

Preparation of Other Post Treated Polysuccinimides Using a Cyclic Carbonate

The procedure of Example 30 was followed except that different polysuccinimides were used. These all used an ethylene carbonate/basic nitrogen CMR of 2.0. These products were analyzed and the data is reported in Table 1.

COMPARATIVE EXAMPLES

Example A

Preparation of a Polysuccinimide From a Copolymer That Contains a Succinic Ratio of Less Than About 1.3 and a Polybutene Molecular Weight of 1300

The procedure of Example 10 was followed except that a copolymer with a succinic ratio of less than 1.3 was used. DETA was used as the polyamine. The product was analyzed and found to contain 0.74% N, and a viscosity @ 100° C. of 1193 cSt.

Examples B–D

Preparation of Polysuccinimides From a Copolymer That Contains a Succinic Ratio of Less Than About 1.3 With Different Polyamines The procedure of Example A was followed using TETA, TEPA, and HPA. These products were analyzed and the data is reported in Table 1.

Example E

Preparation of a Polysuccinimide From a Copolymer That Contains a Succinic Ratio of Less Than About 1.3 and a Polybutene Molecular Weight of 2400

The procedure of Example 22 was followed except that a copolymer with a succinic ratio of less than 1.3 was used. DETA was used as the polyamine. The product was analyzed and found to contain 0.31% N, had a TBN of 3.3, and had a viscosity @ 100° C. of 571 cSt.

Examples F–H

Preparation of Polysuccinimides From a Copolymer That Contains a Succinic Ratio of Less Than About 1.3 With Different Polyamines The procedure of Example D was followed except that TETA, TEPA and HPA were used instead of DETA. These products were analyzed and the data is reported in Table 1.

Examples A through H had a succinic ratio of 1.0.

TABLE I

| EXAMPLE | CMR | POST TREAT | AMINE | % N | VIS | TBN |
|---|---|---|---|---|---|---|
| 10 | 0.87 | | DETA | 1.63 | 2696 | 23.7 |
| 11 | 0.87 | | TETA | 1.99 | 3321 | 37.4 |
| 12 | 0.87 | | TEPA | 2.65 | 4824 | 65.7 |
| 13 | 0.87 | | HPA | 3.53 | 14290 | 97.7 |
| 14 | 0.5 | | DETA | 1.00 | 2409 | 13.0 |
| 15 | 0.5 | | TETA | 1.27 | 3267 | 19.6 |
| 16 | 0.5 | | TEPA | 1.62 | 4049 | 33.4 |
| 17 | 0.5 | | HPA | 2.14 | 5523 | 49.8 |
| 18 | 0.5 | EC | DETA | 1.02 | 2689 | 8.9 |
| 19 | 0.5 | EC | TETA | 1.20 | 4187 | 12.9 |
| 20 | 0.5 | EC | TEPA | 1.55 | 9249 | 15.7 |
| 21 | 0.5 | EC | HPA | 2.02 | 90130 | 22.4 |
| 22 | 0.87 | | DETA | 0.77 | 1317 | 16.1 |
| 23 | 0.87 | | TETA | 1.01 | 1309 | 22.9 |
| 24 | 0.87 | | TEPA | 1.23 | 1599 | 35.0 |
| 25 | 0.87 | | HPA | 1.71 | 1856 | 37.0 |
| 26 | 0.5 | | DETA | 0.51 | 1338 | 5.8 |
| 27 | 0.5 | | TETA | 0.61 | 1491 | 10.6 |
| 28 | 0.5 | | TEPA | 0.76 | 1794 | 16.1 |
| 29 | 0.5 | | HPA | 1.04 | 2164 | 25.1 |
| 30 | 0.5 | EC | DETA | 0.49 | 1350 | 4.9 |
| 31 | 0.5 | EC | TETA | 0.73 | 1636 | 7.3 |
| 32 | 0.5 | EC | TEPA | 0.82 | 2191 | 8.3 |
| 33 | 0.5 | EC | HPA | 0.97 | 3703 | 11.7 |
| A | 0.5 | | DETA | 0.74 | 1193 | |
| B | 0.5 | | TETA | 0.91 | 971 | 15.4 |
| C | 0.5 | | TEPA | 1.08 | 1179 | 16.5 |
| D | 0.5 | | HPA | 1.46 | 1707 | 32.0 |
| E | 0.5 | | DETA | 0.31 | 571 | 3.3 |
| F | 0.5 | | TETA | 0.40 | 578 | 5.6 |
| G | 0.5 | | TEPA | 0.55 | 612 | 8.9 |
| H | 0.5 | | HPA | 0.68 | 672 | 18.2 |

Some lubricating oil additives have been identified as being deleterious to fluoroelastomers such as Viton that are currently used as gasket materials automobile engines. European engine builders have now placed fluoroelastomer seal tests into their engine oil specifications. One such test is the Volkswagen VW3334 (September 1987) Seal Swell Test. This procedure is described in the Third Symposium of the European Coordination Council (CEC) 1989 in an article entitled "Engine and Bench Aging Effects on the Compatibility of Fluoroelastomers with Engine Oils" by Dr. S. W. Harris and J. C. Downey of Amoco Petroleum Additives Company.

The VW3334 (September 1987) Seal Swell Test was carried out on samples of Viton from the Parker Prudifa Company, which were cut into dumbbell shapes, using a formulated lubricating test oil that contained succinimide dispersant, overbased detergent, antioxidant and viscosity index improver materials at a bath temperature of 150° C. for a 96 hour immersion time. The immersion procedure was similar to ASTM D471-79 Standard Test Method for Rubber Property-Effect of Liquids. The Viton samples were then subjected to analysis of their tensile properties using procedures similar to ASTM D412-87 Standard Test Method for Rubber Properties in Tension. The properties that were measured were cracking at 120 percent elongation, percent change in tensile strength (TS) and percent change in elongation at break (EL), in accordance with the VW3334 Seal Swell Test requirements. The results are shown in Table II.

TABLE II

| Example | TS | EL | Cracks | ppm N (Calc) |
|---|---|---|---|---|
| 10 | −14 | −17 | No | 978 |
| 11 | −37 | −33 | Yes | 1194 |
| 12 | −35 | −32 | Yes | 1590 |
| 13 | −35 | −33 | Yes | 2118 |
| 14 | 10 | 02 | No | 600 |
| 15 | 10 | 03 | No | 762 |
| 16 | −01 | −08 | No | 972 |
| 17 | −34 | −32 | Yes | 1284 |
| 18 | −01 | −05 | No | 612 |
| 19 | 02 | −05 | No | 720 |
| 20 | −26 | −20 | No | 930 |
| 21 | −42 | −34 | No | 1212 |
| 22 | −10 | −16 | No | 462 |
| 23 | −29 | −28 | No | 606 |
| 24 | −33 | −28 | Yes | 738 |
| 25 | −35 | −30 | Yes | 1026 |
| 26 | 01 | −03 | No | 306 |
| 27 | 03 | −03 | No | 366 |
| 28 | −02 | −05 | No | 456 |
| 29 | −13 | −17 | No | 624 |
| 30 | 04 | −01 | No | 294 |
| 31 | −02 | −06 | No | 438 |
| 32 | −10 | −12 | No | 492 |
| 33 | −28 | −26 | No | 582 |
| B | −03 | −03 | No | 546 |
| C | −09 | −13 | No | 648 |
| D | −17 | −18 | No | 876 |
| E | 01 | −06 | No | 186 |
| F | −01 | −05 | No | 240 |
| G | −07 | −13 | No | 330 |
| H | −14 | −19 | No | 408 |

These polysuccinimides also impart advantageous fluidity modifying properties

These polysuccinimides also impart advantageous fluidity modifying properties.

TABLE III

| VISCOSITY INDEX FOR POLYSUCCINIMIDES | | | |
|---|---|---|---|
| Example | Conc. | V.I. In Exxon 100N | V.I. In Exxon 600N |
| 26 | 10 | 154 | 108 |
| 27 | 10 | 136 | 110 |
| 28 | 10 | 149 | 118 |
| 29 | 10 | 151 | 119 |
| 30 | 10 | 153 | 116 |
| 31 | 10 | 147 | 106 |
| 32 | 10 | 153 | 114 |
| 33 | 10 | 169 | 116 |

In contrast the V.I. for the same examples as 26–33 except that the conventional thermal PIBSA was used is shown in the following table.

TABLE IV

V.I. DATA FOR CONVENTIONAL SUCCINIMIDES

| Example | Conc. | V.I. In Exxon 100N | V.I. In Exxon 600N |
|---|---|---|---|
| bis DETA | 10 | 140 | 105 |
| bis TETA | 10 | 133 | 99 |
| bis TEPA | 10 | 128 | 103 |
| bis HPA | 10 | 141 | 110 |
| EC bis DETA | 10 | 129 | 99 |
| EC bis TETA | 10 | 123 | 102 |
| EC bis TEPA | 10 | 124 | 103 |
| EC bis HPA | 10 | 133 | 105 |

These data show that the V.I. is greater for the polysuccinimides of the present invention compared to the conventional succinimides.

While the present invention has been described with reference to specific embodiments, this application is intended to cover those various changes and substitutions that may be made by those skilled in the art without departing from the spirit and scope of the appended claims.

What is claimed is:

1. A polysuccinimide prepared by reacting a copolymer with a polyamine having at least one basic nitrogen atom, wherein the copolymer is a copolymer of an unsaturated acidic reactant and a high molecular weight olefin, wherein the ratio of anhydride groups to the hydrocarbon groups is at least 1.3, wherein the olefin is selected from the group consisting of alpha olefin and alkylvinylidene olefin, and wherein the olefin has a sufficient number of carbon atom such that the resulting copolymer is soluble in lubricating oil.

2. A polysuccinimide according to claim 1 wherein the polyamine has the formula $H_2N(YNH)_aH$ wherein Y is alkylene of 2 to 6 carbon atoms and a is an integer from 1 to 6.

3. A polysuccinimide according to claim 2 wherein the charge mole ratio of polyamine to succinic groups in copolymer is from 1 to 0.1.

* * * * *